INVENTORS:
Jean Pfau
Heinz Rhyner

INVENTORS:
Jean Pfau
Heinz Rhyner
By Gradolph, Love, Rogers & VanDiver
ATTORNEYS

United States Patent Office 3,496,088
Patented Feb. 17, 1970

3,496,088
ELECTROLYTIC MACHINING APPARATUS
Jean Pfau, Geneva, and Heinz Rhyner, Meyrin-Geneva, Switzerland, assignors to Anocut Engineering Company, Elk Grove Village, Ill., a corporation of Illinois
Filed Sept. 20, 1966, Ser. No. 580,446
Claims priority, application Switzerland, Sept. 21, 1965,
13,019/65
Int. Cl. B23p 1/02
U.S. Cl. 204—224                10 Claims

ABSTRACT OF THE DISCLOSURE

This invention relates to an electrolytic machining apparatus including a tool electrode. It also includes means for positioning a workpiece, means for relatively moving a workpiece positoning means and the tool electrode and means for supplying electrolyte under pressure to the work gap between the electrode and the workpiece. An electrical system is provided of high current capacity to feed low voltage direct current across the work gap, in a sense to make the electrode cathodic. The electrical system includes controlled rectifiers fed from an alternating current source, and means for igniting the rectifiers once per cycle at adjustable moments thereof. A circuit is operatively connecting the rectifiers with the electrode and variable inductive means including an induction coil in the circuit whose self-inductance varies as a function of the current in the circuit. The induction coil's self-inductance decreases to at least half its value when the current increases from zero to one-half of the maximum nominal value in the circuit in order to minimize the rate of variation of the electrolyzing voltage.

---

This invention relates to an electrolytic machining apparatus and method.

In general, a supply of high current capacity and low voltage is provided for an electrolyzing apparatus having an electrode and a workpiece forming a work gap into which electroylte is injected under pressure for electrolytic machining of a metal part. This operation is performed by anodic dissolution of the part in the presence of the electrolyte between the anodic workpiece and a cathodic tool electrode.

In a proposed embodiment, the method consists of directing the tool electrode towards a part on which is to be impressed the electrode shape. This result is achieved by injecting the electrolyte into the work gap between the electrode and the workpiece under a pressure which is sufficiently high to insure the maintenance of a narrow gap between the electrode and metal part throughout the electrolying operation without risk of a short circuit.

The machining is generally accomplished using high current densities ranging up to a few hundred amperes per in.$^2$. The machining current produced by the supply may reach several thousand amperes and even ten thousand amperes in certain cases.

The supply of the machining current is generally from three phase mains and includes a voltage-lowering transformer, rectifiers and means for adjusting the voltage and breaking the circuit. Among the desired features of such a supply circuit are adjustability, stability, rapid circuit breaking and minimum voltage variation.

The electrolyzing voltage should be adjustable over a large range of values so as to allow for adjustment of the width of the gap between the cathode and the workpiece.

The electrolyzing voltage should be stable and independent of any substantial fluctuations in current intensity during the electrolyzing operation and should also be independent of the fluctuations in the supply voltage.

The breaking of the circuit should be as speedy as possible in response to the detection of an initiating local concentration of current, of arcing, or of short-circuiting which might damage the workpiece and the electrode. Parasitic phenomena of this type may appear as a result of a defective distribution of the flow of the electrolyte within the work gap, of insufficient pressure of injection of the electrolyte, of a too high speed of progression of the electrode, or because of the presence of solid particles within the electrolyte. It is generally possible to detect these phenomena which cause sudden changes in the electrolyzing voltage or current.

The rate of variation of the electrolyzing voltage $\Delta V/V$ should be low and not exceed, for example, $\pm 20\%$. Given a predetermined gap betwen the electrode and the workpiece and a predetermined electroylte at a predetermined injection pressure there is a critical voltage across the work gap above which it is not possible to rise, even for a very short time, without resulting in local concentrations of current, or short-circuiting. Consequently, the higher the rate of variation of the electrolyzing voltage, the lower the allowable average electrolyzing voltage should be. This results in reduction of the average current and a slowing of the electrolyzing operation.

The current supply in the copending application of Pfau et al., Ser. No. 530,997, filed Mar. 1, 1966 (E-37), is of a type satisfying the first three conditions of adjusting the voltage, stability, and rapid circuit breaking of the electrolyzing supply. It includes controlled rectifiers or thyristors fed with alternating current either through the primary or through the secondary of a voltage-lowering transformer. Thus, adjusting and circuit-breaking are ensured respectively by a shifting of the moment of the ingintion of the control rectifiers during each cycle and by cutting off the ignition of the rectifiers.

In order to reduce the high rate of variation of the voltage, the fourth requirement, which is inherent in a supply of low voltage, an induction coil is put in series in the direct current circuit feeding the electrode and the workpiece. The induction coil also limits the intensity of the current in the case of a short-circuit before the supply is actually cut off. The self-inductance of the induction coil is selected as a compromise between the requirements of rapid circuit breaking and minimum voltage variation. If the inductance is low, only a small amount of magnetic energy is stored in the ignition coil and the cut off of the electrolyzing current is rapid, but the rate of variation of the voltage is high. If the inductance is high, the opposite result is obtained—slow cut off and minimum voltage variation. In practice, an allowable average is obtained for electrolyzing current of mean value. However, for a low electrolyzing current, the rate of variation of the voltage is high and for large currents it is low. When the energy stored in the induction coil is large due to a large electrolyzing current, this leads to slow cut off of the electrolyzing current.

The present invention eliminates the drawbacks above by providing a variable saturable induction coil in the direct current electrolyzing supply circuit. This induction coil has a variable inductance which varies as a function of the electrolyzing current.

An object of the present invention is to provide a novel direct current supply for an electrolytic machining apparatus.

Another object of this invention is to provide an induction coil having a variable coefficient such that the current increasing from zero to one-half of its maximum nominal value will result in halving the self-inductance of the coil.

Another object of this invention is to provide a novel electrolyzing supply circuit which minimizes the rate of variation of the electrolyzing voltage.

Another object of this invention is to provide a novel electrolyzing supply circuit including a series induction coil having a variable gap to control the saturation of the coil dependent upon the current in the coil.

Another object of this invention is to provide a novel electrolyzing supply circuit including a pair of series induction coils one of which is saturated and the other of which is non-saturated when the current feeding the coils is equal to its maximum nominal value.

Another object of this invention is to provide a novel, low cost electrolyzing supply circuit having a minimum number of components.

Other objects and advantages will become apparent from the following description taken in conjunction with the accompanying drawings wherein.

Figure 1:
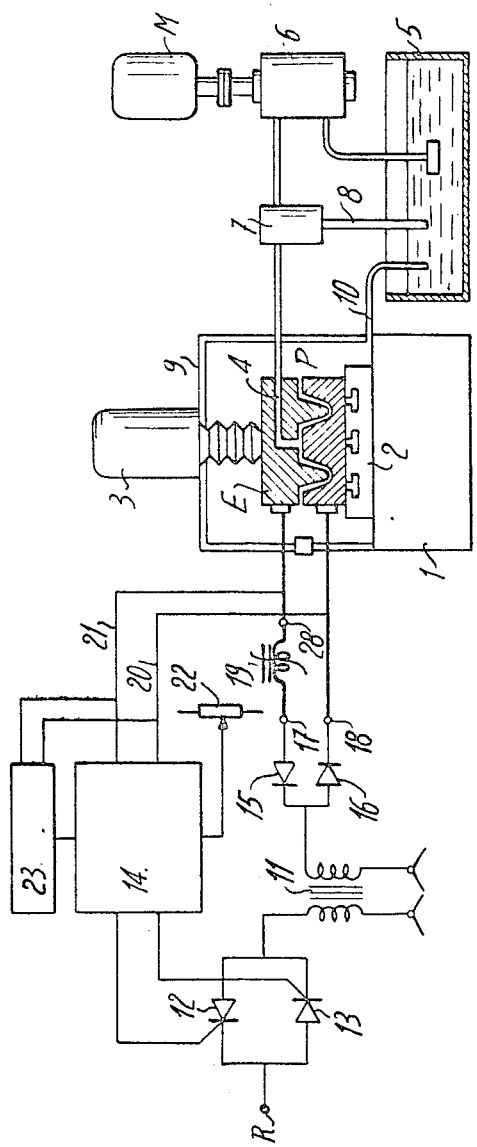
FIG. 1 is a schematic diagram of a circuit of the invention.

The arrangement illustrated includes a frame 1 supporting a table 2 to which is secured a part P to be electrolytically machined. An electrode E carried by a ram 3 controls the vertical movement of the electrode. The ram 3 moves the electrode E relative to the workpiece P through a mechanism (not illustrated) which will advance the electrode at a constant speed.

The electrode E is provided with a channel 4 through which an electrolyte is supplied from a tank 5 by a pump 6 driven by a motor M. The electrolyte is fed into the work gap between the electrode E and the workpiece P. The electrolyte passes through a pressure regulator 7 located ahead of the work gap. A channel 8 is adapted to return the excess electrolyte into the tank 5. The electrolyte flowing through the gap between the part P and the electrode E cannot escape since the machining space is enclosed inside a chamber 9 provides with an exhaust channel 10 for the return of the electrolyte into the vat 5.

The electrolyzing apparatus is supplied from a three-phase alternating current source, of which only one phase, R, has been illustrated. The phase current is fed into the corresponding primary winding of a transformer 11 by two thyristors 12 and 13 whose ignition is controlled by the adjusting circuit 14. In the copending application of Pfau et al., Ser. No. 530,997 (E–37), the details of an electronic control circuit suitable for use with this invention is disclosed.

The secondary of the transformer 11 feeds a rectifier bridge of which only the two rectifiers 15 and 16 feeding one phase have been illustrated. The two rectifiers are connected with the common output terminals 17 and 18 provided for all the rectifiers. Terminal 17 is connected with the electrode E by an induction coil 19 adapted to be partly saturated and which serves for smoothing the shape of the rectifying current.

The voltage across the gap between the electrode E and the part P is fed to the adjusting and releasing circuit 14 over leads 20 and 21 and it is compared with an adjustable reference voltage from a potentiometer 22.

The voltage across the gap between the electrode and the workpiece is also applied to the input of a detecting circuit 23, which acts on the adjusting and releasing circuit 14, so as to prevent any ignition of the thyristors 12 and 13 in response to a sudden modification in the electrolyzing voltage, preliminary to the production of a local concentration of current, of an arcing or of a short-circuit. The induction coil 19 which is adapted to be saturated has self-inductance which varies as a function of the current delivered to it, the inductance decreasing at least by a factor two, when the current increases from zero to one-half its maximum nominal value.

Figure 2:
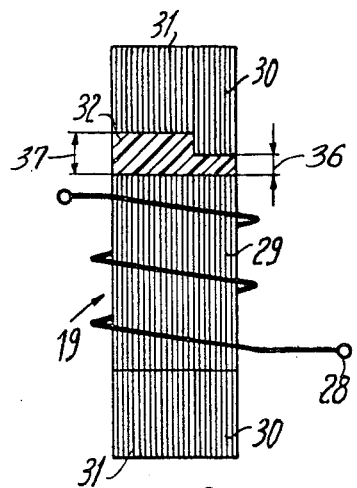
FIG. 2 shows a variable saturation induction coil for use with the circuit of FIG. 1.

FIG. 2 shows an induction coil satisfying the above rerequirements. The winding 33 is carried by a conventional metal sheet magnetic core 29. However, the magnetic core includes two adjacent core elements 30 and 31 which are provided with independent gaps respectively, 36 and 37. Since the two elements 30 and 31 are juxtaposed, the gaps 36 and 37 are in parallel reationship. Thus the induction coil including the two core elements 30 and 31, together with the independent gaps 36 and 37 become saturated in a stepwise manner.

The operation will now be discussed with respect to the curve $L_1$ of FIG. 3 which illustrates the operation of the saturable induction coil 19. When the current is weak, the majority of the lines of force of the magnetic field passes through the narrow gap 36 and the self-inductance is high. Between the intensities $I_1$ and $I_3$, the end of the core element 30 leading to the narrow gap 36 becomes gradually saturated and its reluctance increases, while further lines of force produced by the increase in the current pass to an increasing extent through the broad gap 37 and reach the element 31. This results in a decrease of self-inductance as shown by $L_1$. Above the intensity $I_3$, the end of the element 31 is not saturated, so that $L_1$ remains substantially constant until the value $I_5$ is reached, and at this point element 31 becomes saturated.

Figure 3:
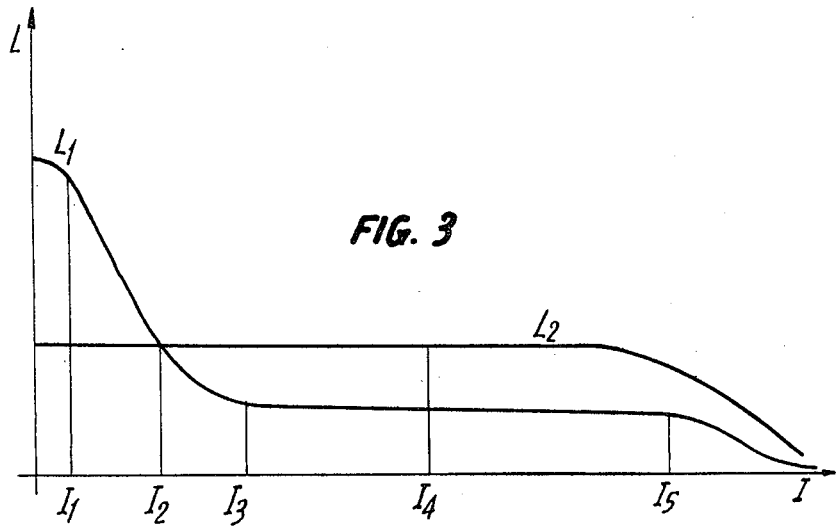
FIG. 3 shows the characteristic curves of two induction coils.

The curve $L_2$ of FIG. 3 forms the characteristic of an ordinary induction coil showing a self-inductance of constant value, the induction coil being of the type used for conventional supplies of electrolytic machining currents.

It is obvious from examination of FIG. 3, that for value of current less than $I_2$, the coil 19 has a heilf-inductance which is higher than, in the case of an ordinary induction coil. Consequently, the variation ratio of the voltage is lower than the coil has a variable self-inductance than for an ordinary induction coil for currents below $I_2$. Correspondingly, the circuit response is slower when the current decreases below $I_2$ for the variable inductance coil.

The inductances are substantially constant between the values $I_3$ and $I_5$ of the current. $I_4$ is substantially equal to 50% of the maximum nominal current. Above $I_2$, $L_1$ is lower than $L_2$. The rates of variation $\Delta I/I$ and $\Delta V/V$ remain constant up to the value $I_5$ and their values considered as acceptable are equal to say $\pm 20\%$. For intensities between $I_3$ and $I_5$ and passing through $I_4$, $L_1$ is equal, in the example illustrated to about 0.5 $L_2$. The energy W stored in the induction coil is given by the equation:

$$W = \int_0^I L.I.dI.$$

Consequently, the cooperation of these low currents, for which $L_1$ is higher than $L_2$, in the storing of energy, is greater than in the case of larger currents for which $L_1$ is smaller than $L_2$. Thus, in the preceding example, the energy stored in the induction coil 19 for the maximum machining current $I_5$ is about three times lower than that would be stored in an ordinary induction coil, while the current feed has a rate of variation $\Delta I/I$ lower than $\pm 20\%$ even for currents as low as $I_1$, that is much lower than $I_2$.

The time, measured between the moment at which the ignition of the thyristors 12 and 13 of FIG. 1 is cut out, and that for which the induction coil 19 has given out all the energy stored in it, is also substantially reduced, which leads to a reduction in the time during which the current is cut off for currents above $I_2$.

The electrode and the workpiece are thus much better protected than in the case of the conventional supplies of current.

Between the intensities $I_3$ and $I_5$, $L_1$ is substantially constant. The induction coil 19 thereby prevents a too rapid increase of the current in the case of a short-circuit.

Figure 4:
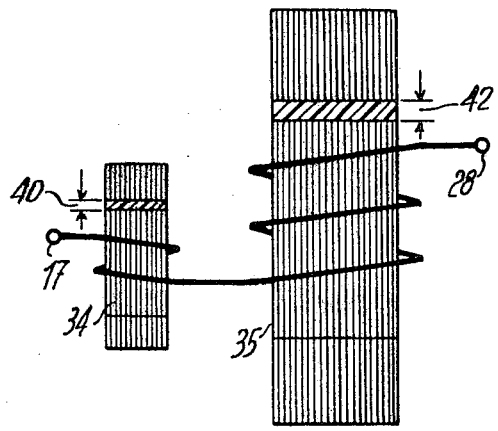
FIG. 4 shows a modification of FIG. 2 including two induction coils.

FIG. 4 illustrates a modified embodiment, wherein the two induction coils 34 and 35 are placed in series and replace the induction coil 19 of FIGS. 1 and 2. The ends of the coil windings are connected respectively with the terminals 17 and 28. The induction coil 34 having a narrow air gap 40 is designed in a manner such that it is saturated for currents above $I_3$, whereas the induction coil 35 having a wide air gap 42 is designed so as to begin being saturated only above $I_5$. The induction coils 34 and 35 inserted in series allow obtaining the same self-inductance as a function of current as in the case of the induction coil 19 of FIG. 2, as illustrated by the curve defining $L_1$ in FIG. 3. This modification, FIG. 4, is thus equivalent to the first embodiment, FIG. 2.

It is also possible to replace the induction coil 19 by induction coils in which the magnetic core has a gap whose width varies continuously from one end of the gap to the other. Furthermore, the induction coil illustrated in FIG. 2 may also be provided with more than two gaps of different widths.

The thyristors 12 and 13 may be inserted in the secondary of the transformer 11 of FIG. 1 and replace the rectifiers 15 and/or 16 without changing the scope of the invention as defined in the accompanying claims.

Similarly, it is obvious that other wiring diagrams for the transformers and rectifiers may be designed for supplying direct current across the terminals 17 and 18.

Various modifications may be made in the invention without departing from the spirit and scope thereof, and it is desired, therefore, that only such limitations shall be placed thereon as are imposed by the prior art and are set forth in the appended claims.

We claim:

1. An electrolytic machining apparatus comprising a tool electrode, means for positioning a workpiece, means for relatively moving the workpiece positioning means and the tool electrode, means for supplying electrolyte under pressure to the work gap between the electrode and the workpiece, an electrical system of high current capacity to feed low voltage direct current across the gap in a sense to make the electrode cathodic, said electrical system including controlled rectifiers fed from an alternating current source, means for igniting said rectifiers once per cycle at adjustable moments thereof, a circuit operatively connecting the rectifiers with said electrode, variable inductive means including an induction coil apparatus in series in said circuit, said induction coil having a variable responsive core and independent gap means to cause the core to become saturated in a stepwise manner, so that the self inductance of the induction coil varies as a function of the current in said circuit and decreases its self inductance to at least half its value when the current increases from zero to one-half of the maximum nominal value in said circuit in order to minimize the rate of variation of the electrolyzing voltage.

2. In an electrolytic machining apparatus as recited in claim 1, wherein said means coupled to said induction coil self inductance varies in a manner such that it is substantially constant throughout a predetermined range of current values.

3. In an electrolytic machining apparatus, the combination recited in claim 1, wherein said means coupled to said induction coil self inductance decreases by less than one-half of its value when the current in said circuit rises from one-half of the maximum nominal value supplied to the induction coil to said maximum nominal value.

4. In an electrolytic machining apparatus, the combination recited in claim 1, wherein said means coupled to said induction coil includes a winding and a core carrying said winding having juxtaposed core sections, the gaps in which have different widths and are arranged in parallel with reference to the magnetic flux produced by the winding.

5. In an electrolytic machining apparatus the combination recited in claim 1, wherein said means coupled to said induction coil includes a winding and core carrying said winding comprising juxtaposed core sections, the gaps in which have different widths and wherein said juxtaposed core sections are arranged in parallel with reference to the magnetic flux produced by the winding, the portions of at least one core section lying to either side of the corresponding gap remain non-saturated when the current feeding said winding is equal to its maximum nominal value.

6. In an electrolytic machining apparatus the combination recited in claim 1, wherein said means coupled with said induction coil includes a winding and core carrying said winding comprising juxtaposed core sections, the gaps in which have different widths and wherein said juxtaposed core sections are arranged in parallel with reference to the magnetic flux produced by the winding, the portions of at least one core section lying to either side of the corresponding gap remaining non-saturated when the current feeding said winding is equal to its maximum nominal value.

7. An electrolytic machining apparatus comprising a tool electrode, means for positioning a workpiece, means for relatively moving the workpiece positioning means and the tool electrode, means for supplying electrolyte under pressure to the work gap between the electrode and the workpiece, an electrical system of high current capacity to feed low voltage direct current across said gap in a sense to make the electrode cathodic, said electrical system including controlled rectifiers fed from an alternating current source, means for igniting said rectifiers once per cycle at adjustable moments thereof, a circuit operatively connecting the rectifiers with said electrode, variable inductive means including at least two induction coils in series in said circuit, wherein the induction coils are designed to respond to different inductances of current, so that the self inductance of the series of coils increases to at least half its value in the circuit when the current increases from zero to one-half of the maximum nominal value in said circuit in order to minimize the rate of variation of the electrolyzing voltages.

8. In an electrolytic machining apparatus the combination recited in claim 7, wherein said means coupled to said variable inductive means includes at least two windings in series having cores carrying individual windings, one of said windings being saturated and the other being non-saturated when the current in said circuit is equal to its maximum nominal value.

9. In an electrolytic machining apparatus as recited in claim 7, wherein said means coupled to said induction coil self inductance varies in a manner such that it is substantially constant throughout a predetermined range of current values.

10. In an electrolytic machining apparatus, the combination recited in claim 7, wherein said means coupled to said induction coil self inductance decreases by less than one-half of its value when the current in said circuit rises from one-half of the maximum nominal value supplied to the induction coil to said maximum nominal value.

References Cited

UNITED STATES PATENTS

| 3,284,691 | 11/1966 | Schulz et al. | 204—143 |
| 3,357,912 | 12/1967 | Inoue | 204—224 |
| 3,378,473 | 4/1968 | Inoue | 204—143 |

ROBERT K. MIHALEK, Primary Examiner

U.S. Cl. X.R.

204—143, 228; 315—111

PO-1050
(5/69)

UNITED STATES PATENT OFFICE
CERTIFICATE OF CORRECTION

Patent No. 3,496,088          Dated February 17, 1970

Inventor(s) J. Pfau, et al.

It is certified that error appears in the above-identified patent and that said Letters Patent are hereby corrected as shown below:

Column 1, line 42 "electroylte" should be -- electrolyte --;
Column 1, line 54 "electrolying" should be -- electrolyzing --.

Column 2, line 18 "electroylte" should be -- electrolyte --;
Column 2, line 37 "ingintion" should be -- ignition --.

Column 3, line 46 "provides" should be -- provided --.

Column 4, line 39 "helf" should read -- self --.

Column 5, line 2 "suppiles" should read -- supplies --.

Column 6, line 14 "remain" should read -- remaining --.

SIGNED AND
SEALED
JUL 21 1970

(SEAL)
Attest:

Edward M. Fletcher, Jr.
Attesting Officer

WILLIAM E. SCHUYLER, JR.
Commissioner of Patents

Dedication 3,496,088.—*Jean Pfau*, Geneva and *Heinz Rhyner*, Meyrin-Geneva, Switzerland. ELECTROLYTIC MACHINING APPARATUS. Patent dated Feb. 17, 1970. Dedication filed Dec. 23, 1971, by the assignee, *Anocut Engineering Company*.

Hereby dedicates to the Public the portion of the term of the patent subsequent to Dec. 24, 1971.

[*Official Gazette April 11, 1972.*]